United States Patent
Bradley et al.

[19]

[11] Patent Number: 5,875,735
[45] Date of Patent: Mar. 2, 1999

[54] MODULAR ANIMAL PERCH ATTACHED TO WALL

[76] Inventors: Joseph E. Bradley; Lauren R. Bradley, both of 20 Briarhill Avenue, Toronto, Ontario, Canada, M4R 1H6

[21] Appl. No.: 771,139

[22] Filed: Dec. 20, 1996

[51] Int. Cl.[6] ........................................... A10K 15/02
[52] U.S. Cl. ............................................... 119/706
[58] Field of Search ............................... 119/706

[56] References Cited

U.S. PATENT DOCUMENTS

| | | | |
|---|---|---|---|
| D. 322,873 | 12/1991 | Queen et al. | 119/706 |
| 2,894,487 | 7/1959 | Goldson | 119/706 |
| 2,997,019 | 8/1961 | Bryson | 119/706 |
| 3,085,551 | 4/1963 | Helmer | 119/706 |
| 3,604,397 | 9/1971 | Selerno | 119/706 |
| 3,993,027 | 11/1976 | Mullin | 119/706 |
| 4,047,502 | 9/1977 | Gordon, Jr. | 119/706 |
| 5,002,012 | 3/1991 | Pierrot | 119/706 |
| 5,067,440 | 11/1991 | Hatten et al. | 119/706 |
| 5,113,795 | 5/1992 | Delzio | 119/51.01 |
| 5,450,819 | 9/1995 | Gray et al. | 119/706 |
| 5,577,466 | 11/1996 | Luxford | 119/706 |
| 5,713,306 | 2/1998 | Johnson | 119/706 |

FOREIGN PATENT DOCUMENTS

| | | | |
|---|---|---|---|
| 1250190 | 2/1989 | Canada . | |
| 2628637 | 12/1977 | Germany | 119/706 |

OTHER PUBLICATIONS

Doctors Foster Smith, Summer 1995 catalog, pp. 12–15.
J.D.'s Cat Habitats, undated, 2 sheets.
Cat House Originals, Inc., 1995–1996, 5 sheets.

*Primary Examiner*—John Hilten
*Assistant Examiner*—Daniel J. Colilla
*Attorney, Agent, or Firm*—Dowell & Dowell, P.C.

[57] ABSTRACT

A modular animal perch is disclosed. It is designed primarily for use by cats but it may be adapted for use by other domestic animals. The modular cat perch includes at least one scratching/climbing panel and at least one horizontal surface. The panel has a top portion, a bottom portion, vertical edge portions, an outer surface and an inner surface and extends upwardly from the floor. The horizontal surface is adapted for use by the animal so that it can perch thereon. The horizontal surface is attached to the at least one scratching/climbing panel. The scratching/climbing panel is attached to the wall. Preferably there is a cap which extends around the top most top portion of the scratching/climbing panel. Preferably there is a base which extends around the bottom most bottom portion of the scratching/climbing panel. The scratching/climbing panel together with the cap and base form a column like structure which has an appearance of a Greek or Roman type column. The modular animal perch may include a plurality of scratching/climbing panels and a plurality of platforms. The modular animal perch may be attached to two adjacent wall in a corner.

18 Claims, 10 Drawing Sheets

MODULAR ANIMAL PERCH ATTACHED TO WALL

FIELD OF THE INVENTION

This invention relates animal perches and in particular to a modular unit that may be assembled in different configurations to provide a place for animals to perch, scratch and exercise.

Background of the Invention

It is well known that animals and in particular cats like a place to perch. It is also important to provide an adequate surface for the cat to climb and scratch on, especially indoor cats whether clawed or de-clawed. These activities are natural for cats and it is important for the health of the cat to provide a device for the cats to pursue these activities. It is also important to provide a separate device for cats to pursue these activities so that they will use this device as their primary scratching and climbing post and thus the cat will not ruin any furniture. Ideally such a device will be as unobtrusive as possible or will complement the decor in the home of the owner.

A number of different scratching and/or climbing apparatus have been proposed. Typically these devices are free standing devices made of wood or covered with carpeting. For example such devices are shown in U.S. Pat. No. 3,604,397 issued to Selerno; U.S. Pat. No. 2,997,019 issued to Bryson; U.S. Pat. No. 2,894,487 issued to Goldson and U.S. Pat. No. 3,085,551 issued to Helmer. However, there are a number of problems with these free standing devices. Often these devices will move or rock when a cat is using it and this may cause the cat to be less likely to use it. Further, typically, these devices take up a lot of floor space. Another disadvantage of the devices covered with carpet is that a cat can catch its claw in the carpeting, especially loop type carpeting. A disadvantage of the devices made of wood is that the wood can splinter when scratched by a cat The splintered wood could then injure the cat. A further disadvantage is that many of these devices are round and narrow and not conducive for a cat to climb.

To overcome some of the above disadvantages various devices have been proposed. For example, an alternate scratching post is shown in Canadian patent 1,250,199 issued to Frank Lawrence on Feb. 21, 1989. This scratching post assembly has a plurality of generally cylindrical cork elements in a stacked relationship and mounted in a bracket that may be attached to a wall, door or cage. This scratching post overcomes the problems associated with carpet on the scratching post but it is a uni-functional device. This device does not provide a perch for the cat nor does it provide a means for the cat to gain any exercise through climbing. Further, the cork is subject to crumbling and is messy when this degradation takes place.

Another alternate scratching post is shown in U.S. Pat. No. 3,993,027 issued to Mullin which consists of a plurality of vertically stacked corrugated cardboard sheets. A major disadvantage of this device is that cardboard is easily shredded and mutilated by the cat's claws causing an unsightly mess and necessitating frequent replacement.

Another alternate free standing exercise, perch device is a tree type structure. The device has a vertical support which is made from natural wood with a plurality of branches extending outwardly there from. The branches have a plurality of platforms thereon. The platforms are covered with carpeting material and are positioned such that a cat can jump from one to the other. These units are very large, would take up a lot of space and would be difficult to transport.

Accordingly, it is desirable to provide an animal perch which is easy to assemble and provides a cat with a place to scratch, perch and exercise. In addition it is desirable that the perch takes up a minimal floor space and is covered with a fabric in which a cat's claws will not catch.

SUMMARY OF THE INVENTION

The present invention is a modular animal perch. It is designed primarily for use by cats but it may be adapted for use by other domestic animals. The modular cat perch includes at least one generally vertical scratching/climbing panel, at least one horizontal surface, and a mounting assembly to releasably attach the scratching/climbing panel to the wall. The scratching/climbing panel has a top portion, a bottom portion, vertical edge portions, an outer surface and an inner surface and extends upwardly from the floor. The horizontal surface is adapted for use by the animal so that it can perch thereon. The horizontal surface is attached to the at least one scratching/climbing panel. The mounting assembly includes at least one mounting plate attached to the wall and an elongate vertical support beam attached to the mounting plate. The scratching/climbing panel is releasably attached to the elongate vertical support beam. Preferably there is a cap which extends around the top portion of the top most scratching/climbing panel. Preferably there is a base which extends around the bottom portion of the bottom most scratching/climbing panel. The scratching/climbing panel together with the cap and base form a column like structure which has an appearance of a Greek or Roman type column.

In another aspect of the invention a modular animal perch includes a plurality of vertical scratching/climbing panels, a plurality of platforms, a mounting assembly for releasably attaching scratching panels to the wall and a second mounting assembly for attaching the platforms to the wall. Each scratching/climbing panel has a top portion, a bottom portion, vertical edge portions, an outer surface and an inner surface and extending upwardly from the floor. Each platform extending outwardly from the climbing/scratching panels wherein an animal can perch. Each platform is attached to the scratching/climbing panel. One of the plurality of platforms is a full platform which extends outwardly around the whole scratching/climbing panel and has an aperture formed therein whereby an animal can fit therethrough. The platforms are attached to the wall such that each platform is a horizontal surface for animal to perch.

In a further aspect of the invention a modular animal perch includes a plurality of generally vertical scratching/climbing panels, a plurality of platforms, a mounting assembly to releasably attach the scratching/climbing panels to the wall and a second mounting assembly to attach the platforms to the wall. Each scratching/climbing panel has a top portion, a bottom portion, vertical edge portions, an outer surface and an inner surface and extends upwardly from the floor. Each scratching/climbing panel is arcuate in shape and the vertical edge portions are spaced from the wall. Each platform extends outwardly and generally horizontally from the climbing/scratching panels. Each platform has a top surface and a bottom surface. At least one platform has an aperture formed therein extending from the bottom surface to the top surface thereof.

In a still further aspect of the invention a modular animal perch includes a plurality of generally vertical scratching/climbing panels, a plurality of platforms, a mounting assembly to attach the scratching/climbing panels to the wall and a second mounting assembly to attach the platforms to the wall. Each vertical scratching/climbing panel has a top portion, a bottom portion, vertical edge portions, an outer surface and an inner surface and extends upwardly from the floor. Each platform extends outwardly and generally horizontally from the climbing/scratching panels and has a top surface and a bottom surface. At least one platform has an aperture formed therein extending from the bottom surface to the top surface thereof. Each platform has a notch formed therein and a corresponding notch is formed in an elongate vertical support beam and a pair of fasteners attaching each platform to separate mounting plates.

In a still further aspect of the invention a modular animal perch includes a plurality of generally vertical scratching/climbing panels, a plurality of platforms, a first mounting assembly to attach the scratching/climbing panels to the wall and a second mounting assembly to attach the platforms to the wall. Each vertical scratching/climbing panel has a top portion, a bottom portion, vertical edge portions, an outer surface and an inner surface and extends upwardly from the floor. Each platform extends outwardly and generally horizontally from the climbing/scratching panels and has a platform notch formed therein. The first mounting assembly includes a plurality of mounting plates which are attached to the wall and an elongate vertical support beam attached to the mounting plates. Each scratching/climbing panel is releasably attached to the elongate vertical support beam. The second mounting assembly includes a pair of fasteners for attaching each platform to one of the mounting plate and a plurality of positioning notches formed in the elongate vertical support beam adapted to correspond to the plurality of platform notches. In position each platform fits snugly into said positioning notches.

According to a further aspect of the invention the modular animal perch can be attached to two adjacent walls in a corner.

Further features of the invention will be described or will become apparent in the course of the following detailed description.

BRIEF DESCRIPTION OF THE DRAWINGS

The invention will now be described by way of example only, with reference to the accompanying drawings, in which.

DETAILED DESCRIPTION OF THE INVENTION

Figure 1:
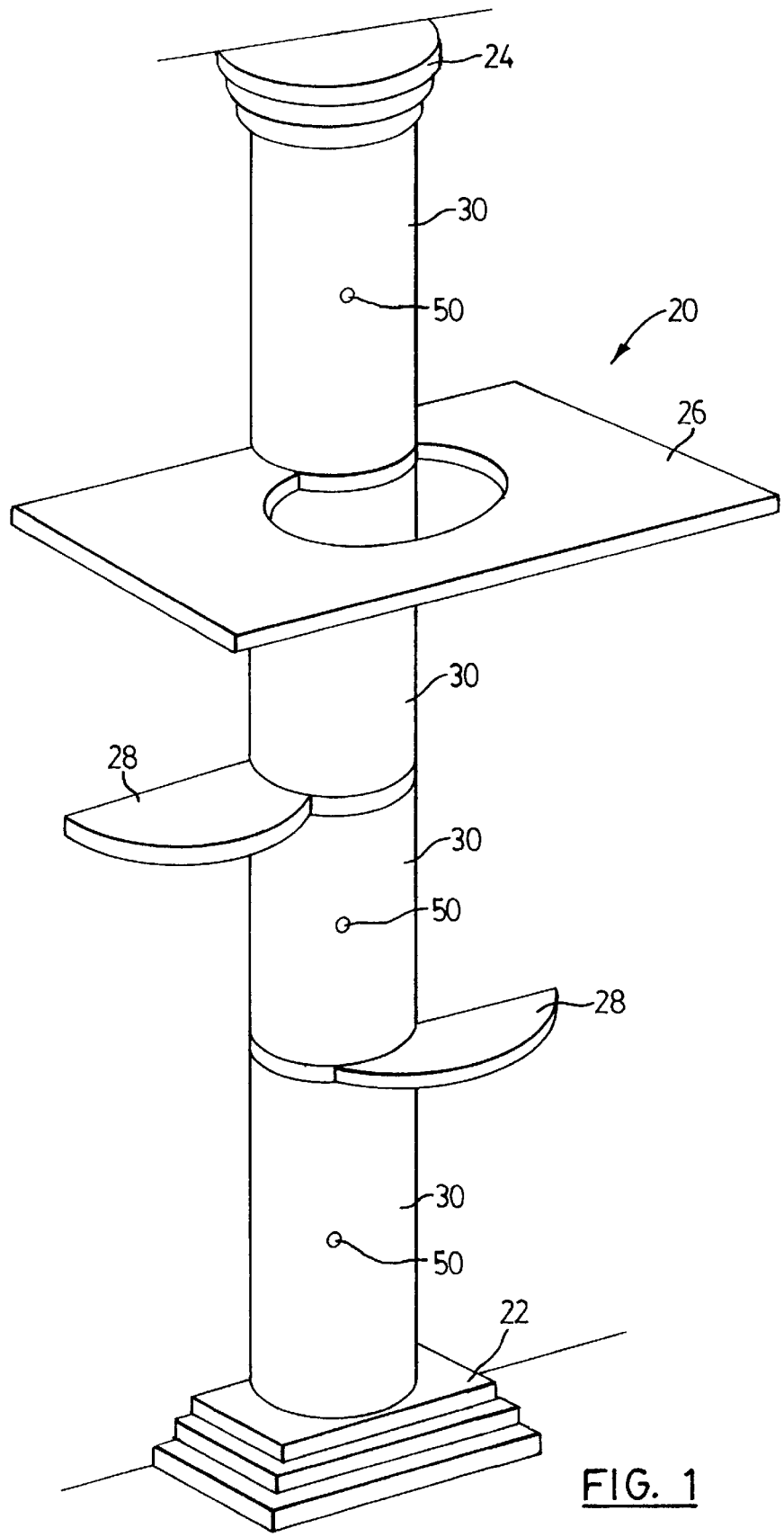
FIG. 1 is a perspective view of the floor to ceiling wall mounted multi platform modular animal perch constructed in accordance with the present invention.
Figure 2:
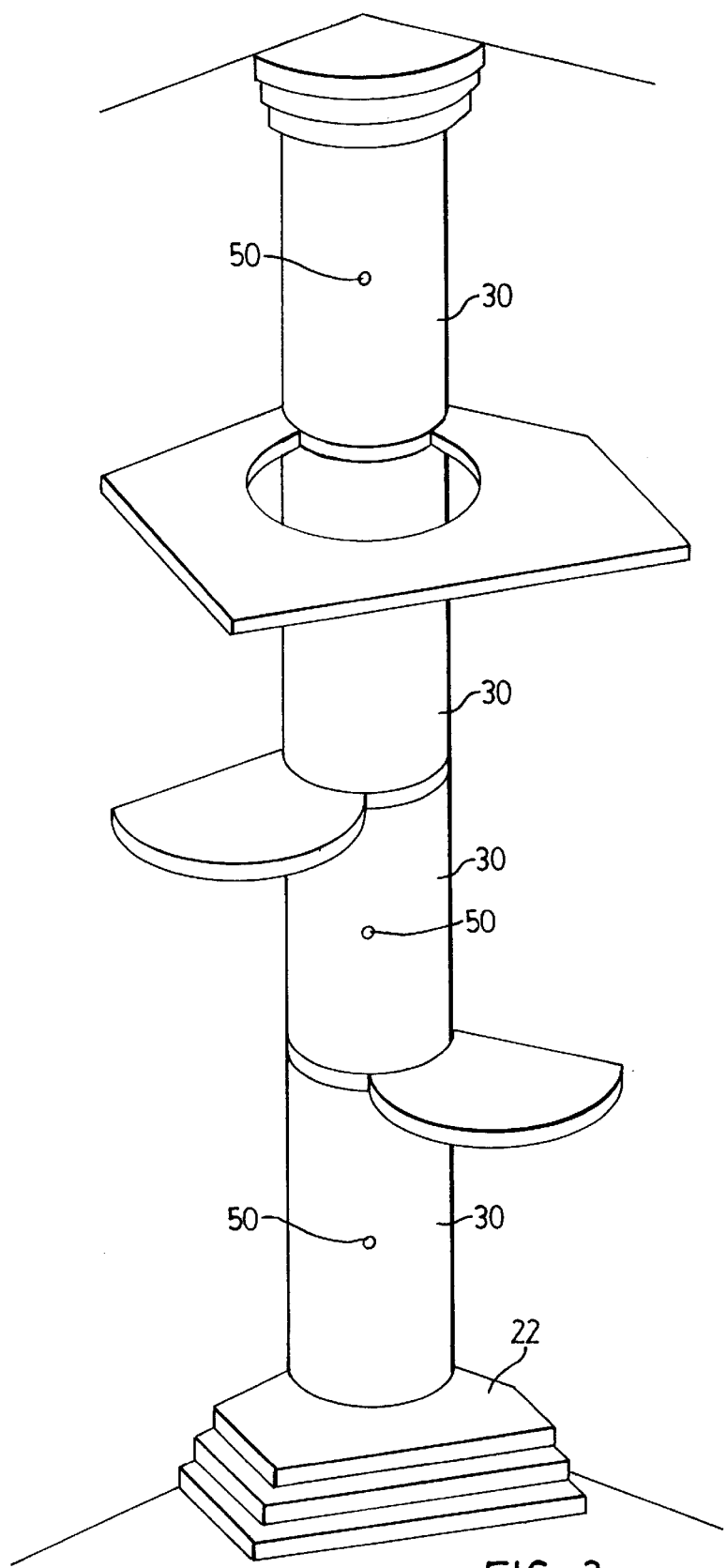
FIG. 2 is a perspective view of the floor to ceiling corner mounted multi platform modular animal perch constructed in accordance with the present invention.
Figure 3:
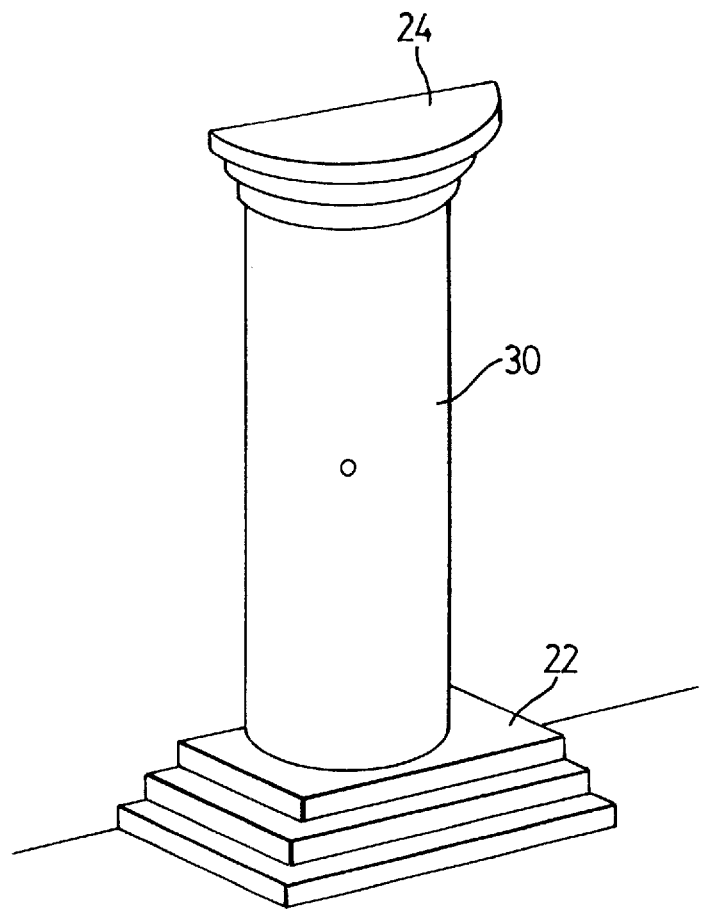
FIG. 3 is a perspective view of the mid-height wall mounted uni-platform modular animal perch constructed in accordance with the present invention.
Figure 4:
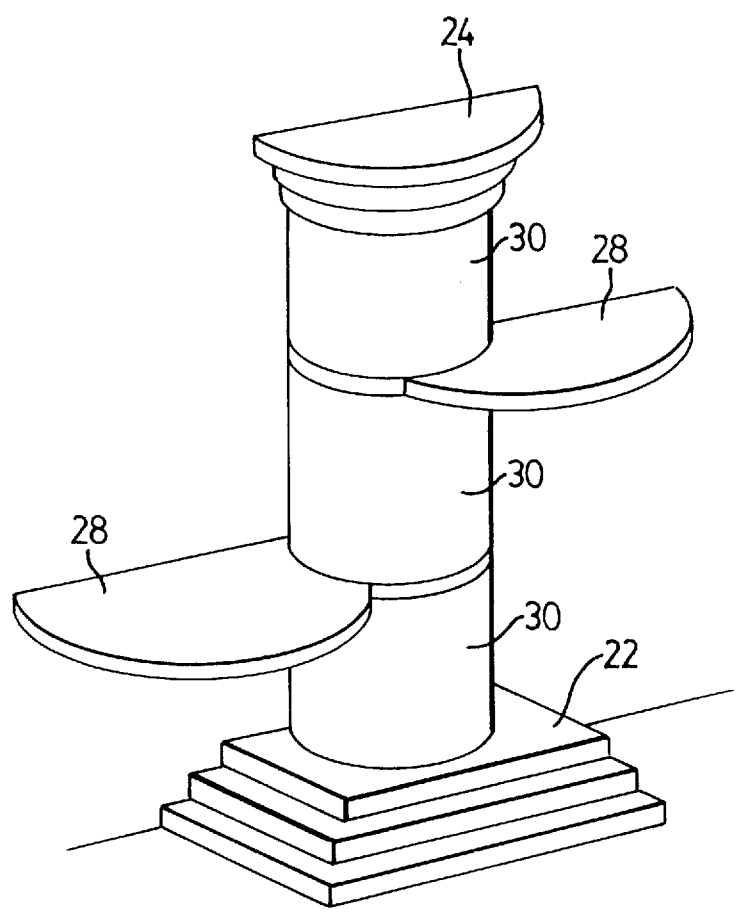
FIG. 4 is a perspective view of the mid-height wall mounted multi platform modular animal perch constructed in accordance with the present invention.

Referring to the drawings and in particular FIG. 1, the modular animal perch is shown generally at 20. The perch 20 includes a base 22, a cap 24, a full platform or shelf 26, a side platform or shelf 28 and a plurality of climbing/scratching panels 30. The modular animal perch of the present invention can also be adapted to be installed in a corner as shown in FIG. 2. Alternatively, FIG. 3 shows a modular animal perch with only one climbing/scratching panel 30, a cap 24 and a base 22. FIG. 4 shows a modular animal perch similar to that of FIG. 3 but having a plurality of side platforms or shelves 28. The modular animal perches shown in FIGS. 1 through 3 are primarily designed for cats. The modular animal perch shown in FIG. 4 has platforms 28 spaced closer together so that a dog could jump from one to the other and perch on the cap.

The modular animal perch 20 will be described for use by a cat. However, it will be appreciated by those skilled in the art that it may be adapted for use by other domestic animals as is shown in FIG. 4.

The perch 20 is of a modular construction so that it can be assembled and transported easily. In addition since it is modular the configuration of the platforms can be varied to suit the user's needs and their cat's needs. As well since it is modular if one section needs to be replaced due to wear only that section need be replaced rather than the whole unit as would have been the case with prior art units.

Figure 6:
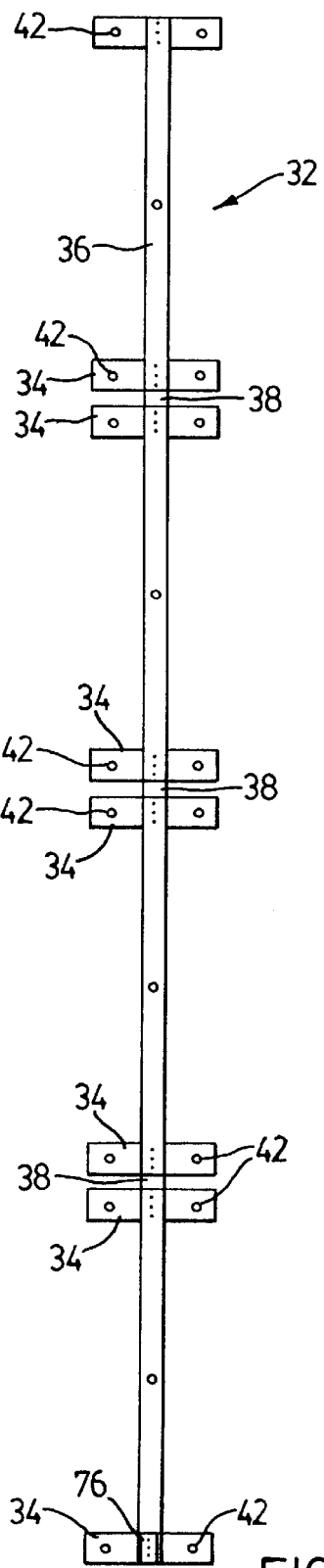
FIG. 6 is a front view of the sub-frame of the modular animal perch of the present invention.
Figure 7:
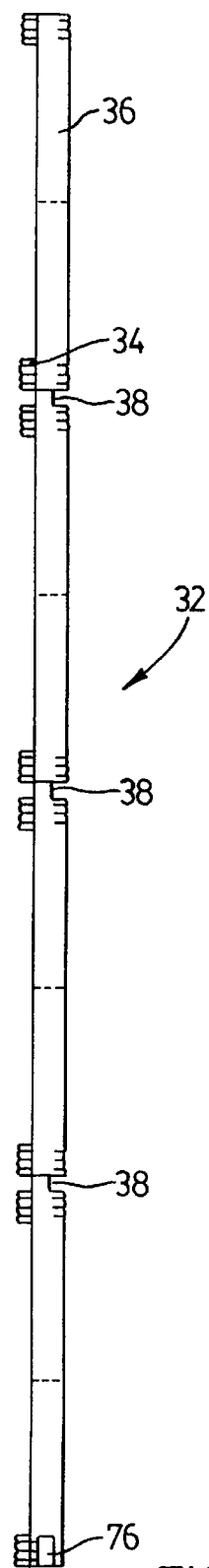
FIG. 7 is a side view of the sub-frame.

Referring to FIGS. 6 and 7 a sub-frame is shown generally at 32. Sub-frame 32 includes mounting plates 34 and elongate vertical support beams 36. Mounting plates 34 are attached to the wall and elongate vertical support beam 36 is attached to mounting plates 34. Elongate vertical support beams 36 may be one continuous piece or alternatively beam 36 may be a plurality of beams connected end to end. Support beams 36 may be connected with a typical male/female type connection (not shown). Alternatively support beams 36 may be connected with steel joinder plates. It will be appreciated by those skilled in the art that other types of connections could also be used. Elongate vertical support beam 36 has a plurality of notches 38 formed therein, as best seen in FIG. 7. The dimensions of notch 38 are such that platforms 26 and 28 will fit snugly therein. Notch 38 shown here is ¾ inches high by 1½ inches wide and 1½ inches deep. The size of this notch is chosen to correspond with a corresponding notch formed in platforms 26 and 28 which are constructed of ¾ inch plywood discussed in more detail below. Preferably elongate vertical support beam 36 is made from 2 inch by 3 inch lumber or a suitable light weight metal.

Figure 8:
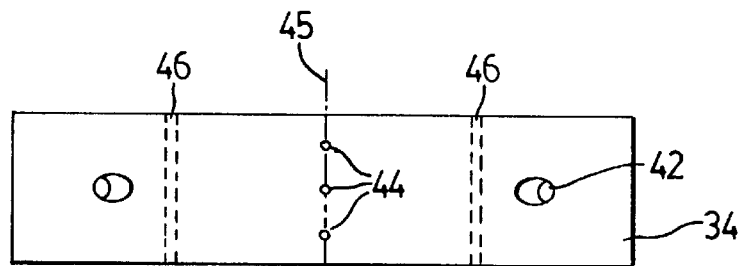
FIG. 8 is a front view of the mounting plate of the sub-frame.
Figure 9:
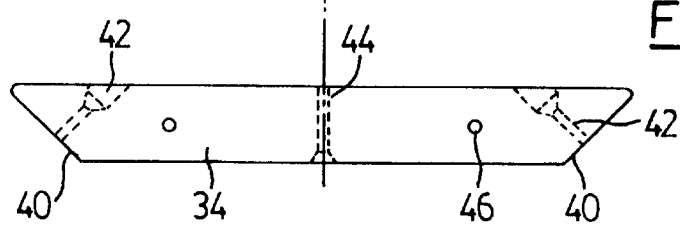
FIG. 9 is a top view of the mounting plate of the sub-frame.

Referring to FIGS. 8 and 9, mounting plates 34 are designed such that they can be installed on either a wall or in a corner. The ends 40 of mounted plates 34 are at a 45° angle so that mounting plates may be attached to a corner. A pair of angled apertures 42 are formed at the edges thereof for securing the plate 34 to the corner. A plurality of apertures 44 are formed in along the center line 45 of plate 34 for securing beam 36 to plate 34 and for securing plate 34 to the wall when plate 34 is mounted on the wall. Preferably the mounting plates 34 will be centred on the wall studs however, this is not necessary if appropriate wall anchoring systems are used. A pair of holes 46 are formed in mounting plate 34 and are used to secure platforms 26 and 28. Holes 46 have female threaded insert plugs screwed into them (not shown) to allow corresponding hex bolts inserted through corresponding holes 48 (shown in FIGS. 15 through 19) in the platforms 26 and 28 to be secured to the sub-frame 30.

Figure 12:
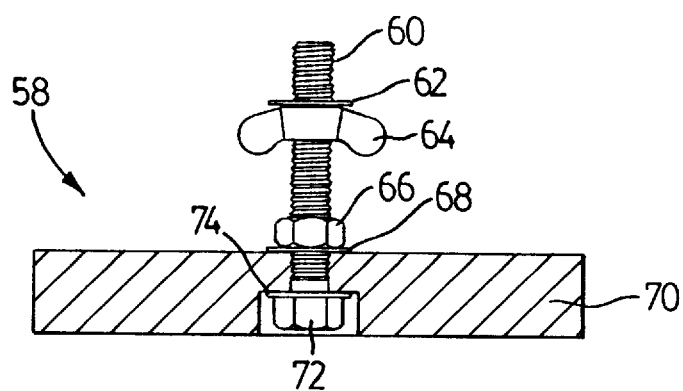
FIG. 12 is an illustration of the tension fit device.

Referring to FIG. 12, a tension fit device is shown genereally at 58. The tension fit device 58 is used to adjust the elongate vertical support beam 36 so that modular animal perch 20 can extend all of the distance between the floor and the ceiling. Tension fit device 58 helps to hold the perch 20 securely in place. In addition, base 22 is attached thereto. Tension fit device includes a threaded steel rod 60, a washer 62, a winged nut 64, a lock or acorn nut 66, a lock washer 68 and bottom support 70. Preferably threaded steel rod 60 is ½ inch by 11 inches.

In use the top 72 of threaded steel rod 60 togehter with a washer 74 is inserted into bottom support 70. The end or rod 60 is inserted into the corresponding hole 76 formed in the bottom of elongate vertical support beam 36 shown in FIGS. 6 and 7. Flat steel washer 62 and ½" diameter butterfly or wing nut 64 is threaded down the rod 60 a distance equal to that which would enable the entire unit to be placed against a wall or in a corner where it would fit snugly or firmly in place between the floor and ceiling. Nut 66 is a ½" diameter steel nut that is screwed downwards until it touches the top of bottom support 70. Flat steel washer 68 is positioned between nut 66 and bottom support 70. Bottom support 70 is 2" thick by 10" wide by 4" deep. A ½" hole is formed in the centre from the top down with a corresponding ¾" by 1" deep countersunk hole drilled into the bottom centre of bottom support 70. This countersunk hole allows a lock or acorn nut 66 to be screwed to the bottom of the threaded rod 60 which in turn is inserted through the top hole of bottom support 70. When nut 66 is then tightened it holds the threaded rod 60 firmly in place in the bottom support 70. Once in place and inserted into the bottom of the sub-frame, the wing nut can be turned in a clockwise or upward direction compressing the unit between the floor and ceiling.

Figure 13:
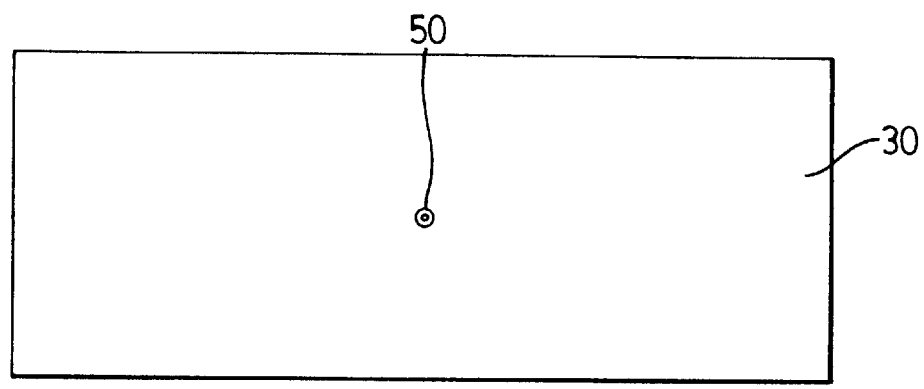
FIG. 13 is a front view of the climbing/scratching panel.
Figure 14:
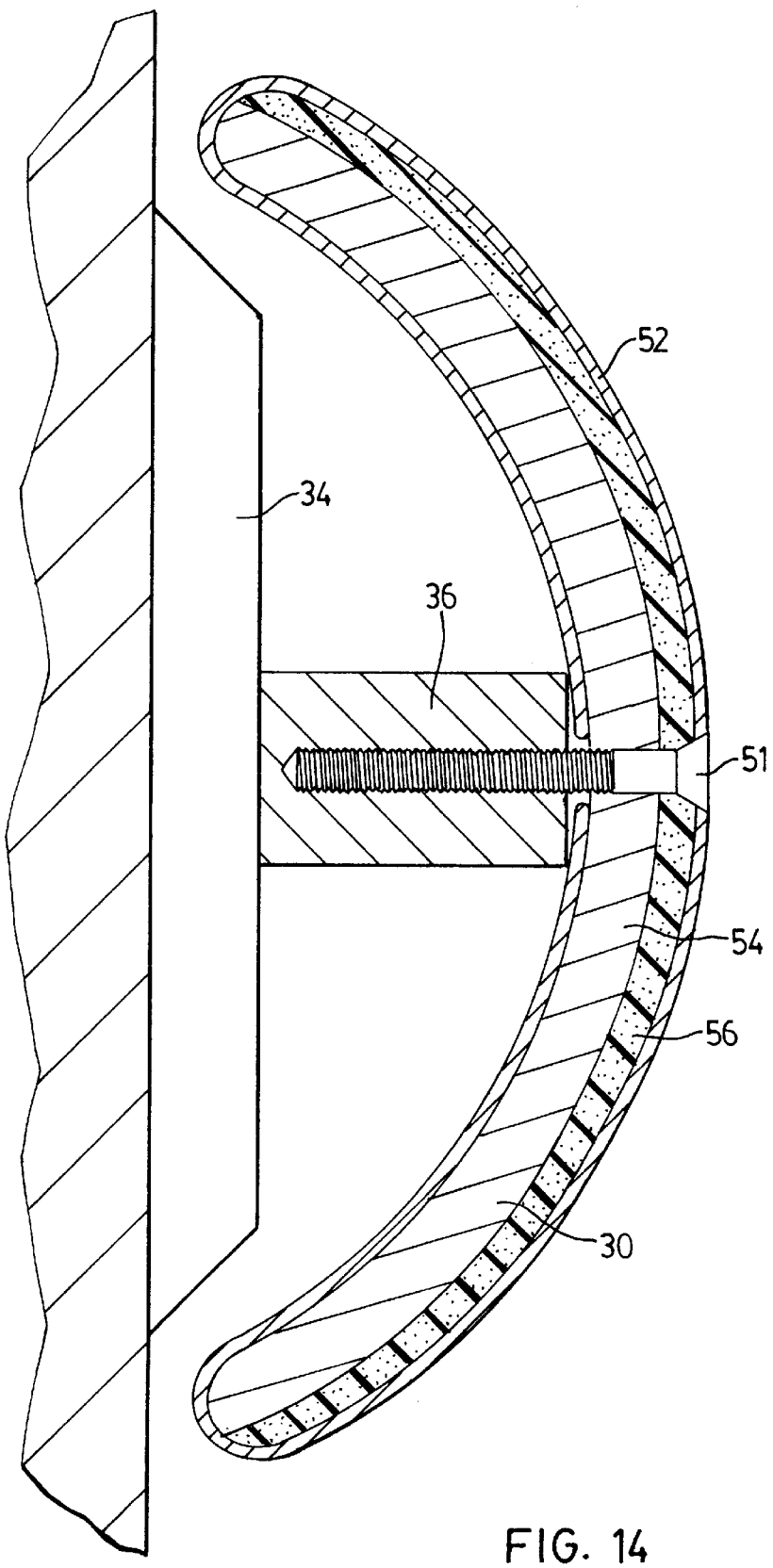
FIG. 14 is an enlarged cross sectional view of the climbing/scratching panel mounted on a wall.

Referring to FIGS. 13 and 14, climbing/scratching panel 30 is arcuate in shape. With regard to the embodiment designed for use by cats, there are two main sizes used and by varying the panels used a wide variety of heights can be achieved so as to meet the needs of a variety of users. The smaller panel 30 is 21" high by ½" thick with a radius of 12". The taller panel 30 is 25" in height by ½" thick with a radius of 12". However, it will be appreciated by those skilled in the art that a wide variety of sizes could be chosen for panel 30. An aperture 50 having a 5/16" diameter hole is formed in the exact centre of the panel 30. Aperture 50 is adapted to receive a flat-topped smooth hex or Allen key bolt 51 which is inserted therethrough to attach the panel 30 to a corresponding threaded female insert plug mounted in the beam 36 of sub-frame 30.

Scratching/climbing material 52 is wrapped around the panel core 54 and attached at the back by using a strong adhesive. Material 52 can be any material chosen by the user to coordinate with the decor of the room. Preferably material is a durable burlap/hemp material, sisal rope, carpet or a strong drapery fabric. A ⅛" to ¼" foam 56 under-padding is placed between the panel core 54 and the material 52 on the front to allow for a cat's claws to penetrate the scratching/climbing material 52 which in turn allows the cat to climb the structure. As can be seen in FIG. 14 panel 30 is spaced from the wall. This allows a cat to essentially grip the side of panel 30 with its paws. Thus a de-clawed cat will be able to climb the modular animal perch.

Figure 5:
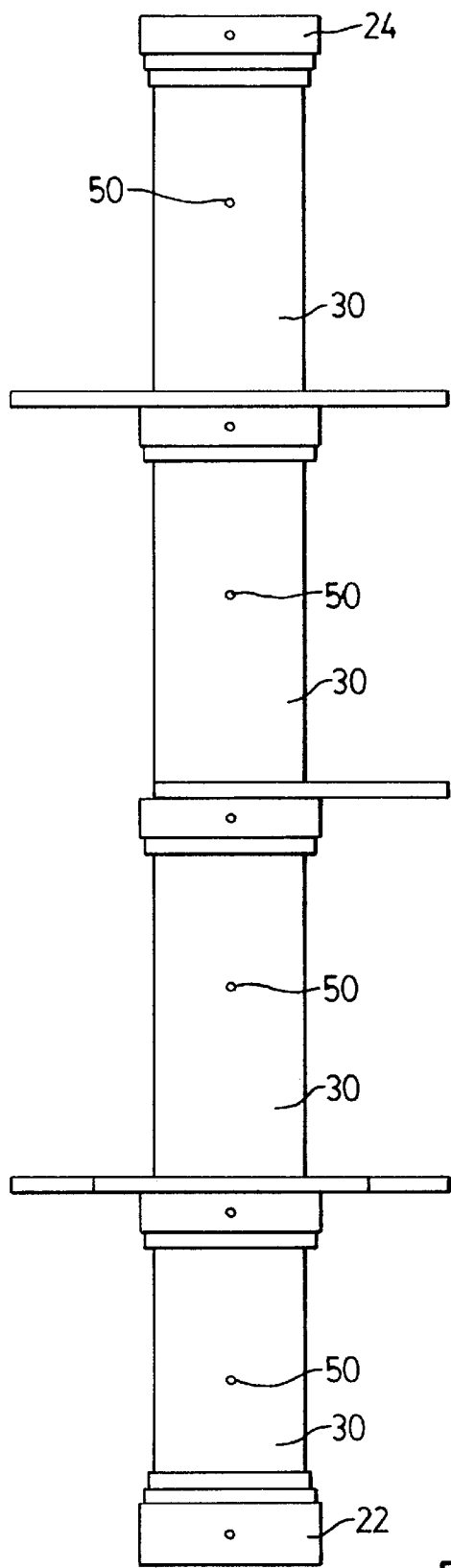
FIG. 5 is a front view of the floor to ceiling modular wall mounted multi platform modular animal perch.
Figure 10:
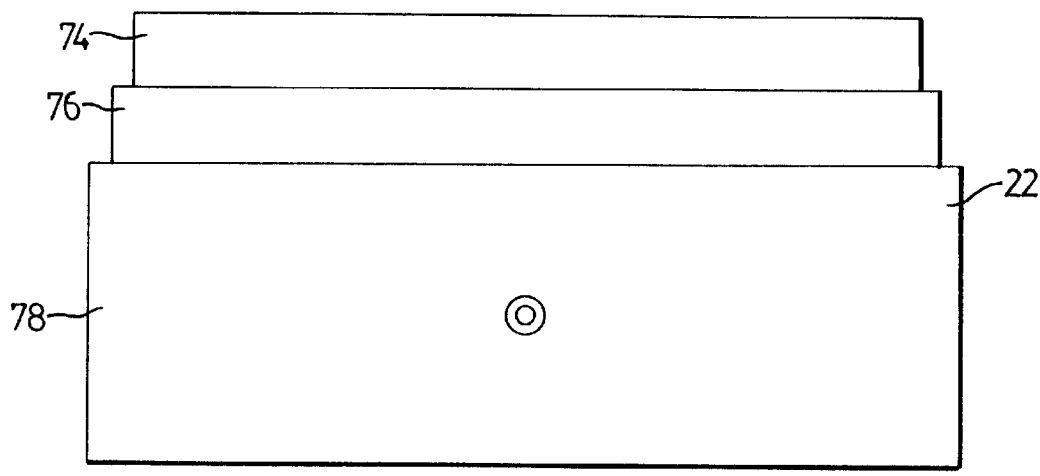
FIG. 10 is a front view of the base of the modular animal perch shown in FIG. 5.
Figure 11:
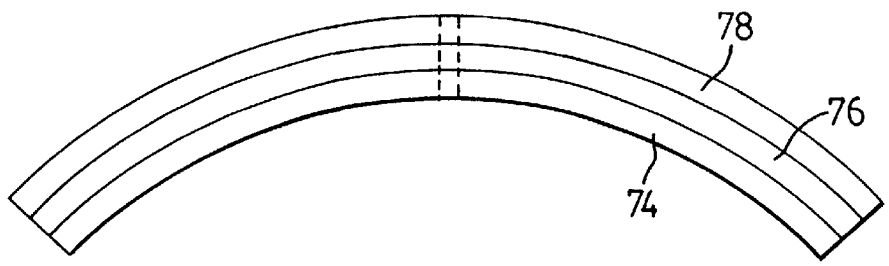
FIG. 11 is a top view of the base shown in FIG. 10.

Cap 24 and base 22 are used to provide the finished look of a pillar in the Greek or Roman tradition. Each one varies in height and length as they are used on specific units and for specific purposes, one purpose being to try and provide the maximum scratching/climbing surface for cats without taking away from the aesthetic appeal of the unit. Cap 24 and base 22 are constructed out of ½" compressed cardboard tubing that is a waste product of the paper industry and is exceptionally strong yet light weight. A combination of 2 or 3 sections of a cardboard tube glued/screwed together to form a tiered appearance is used. FIGS. 10 and 11 show a three tiered base 22. Preferably base 22 is a total of seven inches high. Thus inner portion 77 is 7 inches high with the middle portion 76 at five inches and the outer portion 78 at three inches. FIGS. 5, 10 and 11 show a curved base 22. Alternatively a square base could be used as shown in FIGS. 1 through 4.

Cap 24 is of a similar construction as base 22 described above. Preferably cap 24 is a total of four inches high with subsequent three and two inch pieces glued/screwed on to it.

Scratching/climbing panels 30, cap 24 and base 22 are constructed of a compressed cardboard material that is very strong and durable. This material comes in a full circular tube of various heights that is used in the paper industry to wrap rolls of paper around and is a waste product of that industry. The tube is used in its fully circular form to construct the free standing model.

Figure 15:
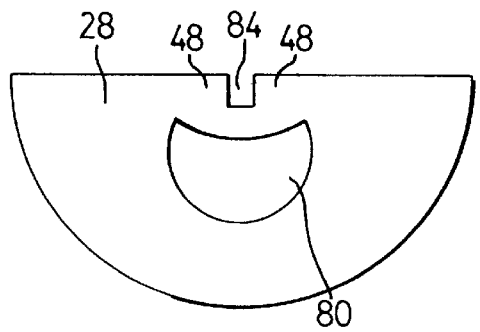
FIG. 15 is a top view of the full platform with an aperture therein for the wall mounted modular animal perch.
Figure 16:
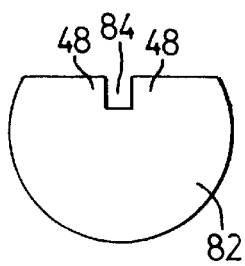
FIG. 16 is a top view of a smaller full platform for the wall mounted modular animal perch.
Figure 17:
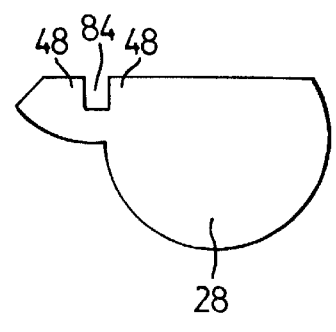
FIG. 17 is a top view of a side platform for the wall mounted modular animal perch.
Figure 18:
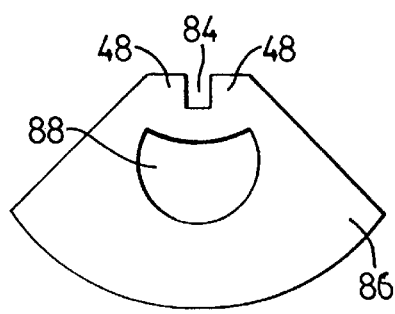
FIG. 18 is a top view of a full platform with an aperture therein for the corner mounted modular animal perch.
Figure 19:
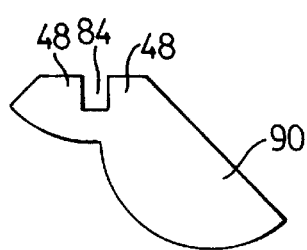
FIG. 19 is a top view of a full platform with an aperture therein for the corner mounted modular animal perch.

FIGS. 15, 16 and 17 show the platforms used with the wall mounted modular animal perch. FIGS. 18 and 19 show the platforms used with the corner mounted modular animal perch. All platforms are made out of ¾" plywood for extra strength and durability and have a finished wood grain on one side. The construction of the platforms is similar to that of panel 30. All platforms are covered on the top with the desired climbing/scratching material by means of first gluing it to a similarly shaped piece of ¼" stiff cardboard and then attaching that to the top of the platform by means of glue and/or two-sided sticky tape to allow for removal and replacement. There is a piece of ⅛" to ¼" foam under-padding placed between the material and cardboard for extra comfort and to make it more conducive for scratching. The cat or cats do not come in contact with the glued surface. The sides and bottom of all platforms are sanded and then finished with an appropriate wood stain, paint or in some cases, covered with a decorative laminate.

FIG. 15 shows a full platform 26 and is normally used as the top platform of the floor to ceiling or taller models. Platform 28 is approximately 36" wide by 16" deep with an aperture 80 formed therein with a rough circumference of 9" cut through the centre. Aperture 80 allows the cat to climb/jump up through to rest on the platform 26. FIG. 16 shows a half platform 82 which is a modified full platform. Half platform 82 allows for easier access and is used for perch shown in FIGS. 3 and 4. FIG. 17 shows side platform 28 which is 38" wide by 16" deep with each side being 12"

across. This platform is normally used as the mid and/or bottom platform in the floor to ceiling and taller models.

Each platform has a notch 84 which is 1½" by 1½" formed therein. Notch 84 corresponds with notch 38 in beam 36. Notch 84 is adapted such that platform will fit into the corresponding notch 38 formed in beam 36 on the sub-frame 30. Guide holes 48 which are 5/16 inches in diameter are formed in each platform to allow the hex or Allen key bolts to pass through and be attached to the corresponding threaded female insert plugs in the mounting plates 34.

FIGS. 18 and 19 show the two main platform styles for a corner mounted unit. FIG. 18 shows a full platform and corresponds to platform 28 described above and shown in FIG. 15. The back side of the platform 86 is 10¼" wide while the sides are 28" long with an aperture 88 with a rough circumference of 7" formed in the centre. Platform 88 is normally used as the top platform for a floor to ceiling or tall model. FIG. 19 shows a half platform 90. The back side of platform 90 is 10¼" wide while the sides are 20" long and at its widest point in the centre of the platform, is 16". This platform is normally used as the mid and/or bottom platform.

All platforms are sturdy and strong enough that they do not need to be separately supported yet there is a support system that is optional (not shown). This involves the use of shelving or "L" brackets that attach to the centre of the bottom of the platform and then either to the wall using a wall anchoring system, or to an extended mounting plate under each platform. In the latter case, the mounting plate is extended in length so it fits underneath the platform to its end. The "L" brace is then mounted to the bottom of the platform and to the mounting plate instead of the wall.

As discussed above the primary use of this invention is to provide a durable, safe and aesthetically pleasing apparatus for cats to climb, scratch, play and exercise. The unit can also be used by other animals that people have as indoor pets such as ferrets or dogs. Due to the nature of the design of the unit it can also be used as a decorative shelving unit or piece of furniture in the home. The platforms can be used as shelves for plants, stereo speakers or other objects. The device can also be used as a storage area for compact discs, V.C.R., tapes and other similar objects. Because the front panels are removable, these items can be stored behind them therefore providing a unique, not to mention secure and safe, place to store valuables.

While this invention has been described in connection with different embodiments thereof, it will be understood that it is capable of further modifications, and this application is intended to cover any variations, uses or adaptations of the invention following. In general, the principals of the invention and including such departures from the present disclosure as come within known or customary practice in the art to which the invention pertains, and as such, may be applied to the essential features hereinbefore set forth and followed in the scope of the invention or the limits of the appended claims.

What is claimed as the invention is:

1. A modular animal perch adapted to be attached to a wall and resting on a floor comprising:
    at least one generally vertical scratching/climbing panel having a top portion, a bottom portion, vertical edge portions, an outer surface and an inner surface and extending upwardly from the floor;
    at least one horizontal surface wherein an animal can perch attached to the scratching/climbing panel; and
    an attaching means for attaching the scratching/climbing panel to the wall comprising a mounting assembly attached to the wall and fasteners to releasably attach the scratching/climbing panel to the mounting assembly wherein the mounting assembly comprises at least one mounting plate attached to the wall and an elongate vertical support beam attached to the mounting plate and wherein the scratching/climbing panel is releasably attached to the elongate vertical support beam.

2. A modular animal perch as claimed in claim 1 further including a cap extending around the top portion of the scratching/climbing panel.

3. A modular animal perch as claimed in claim 1 further including a base extending around the bottom portion of the bottom most scratching/climbing panel and resting on the floor.

4. A modular animal perch as claimed in claim 1 wherein the scratching/climbing panel is arcuate in shape and the vertical edge portions are spaced from the wall.

5. A modular animal perch as claimed in claim 1 wherein there is a plurality of scratching/climbing panels and a plurality of platforms extending outwardly from the climbing/scratching panels and further including a means to attach the platforms to the wall whereby each platform is a horizontal surface for animal to perch.

6. A modular animal perch as claimed in claim 5 wherein one of the plurality of platforms is a side platform which extends outwardly from one side of the scratching/climbing panel.

7. A modular animal perch as claimed in claim 1 wherein said top portion includes a cap, and wherein the cap includes a top flat portion whereby an animal may perch on the top flat portion.

8. A modular animal perch adapted to be attached to a wall and resting on a floor comprising:
    a plurality of generally vertical scratching/climbing panels each having a top portion, a bottom portion, vertical edge portions, an outer surface and an inner surface and extending upwardly from the floor wherein each scratching/climbing panel is arcuate in shape and the vertical edge portions are spaced from the wall;
    a plurality of platforms extending outwardly and generally horizontally from the climbing/scratching panels, each platform having a top surface and a bottom surface and at least one platform having an aperture formed therein extending from the bottom surface to the top surface thereof;
    an attaching means for attaching each scratching/climbing panel to the wall; and
    a second attaching means for attaching each platform to the wall.

9. A modular animal perch as claimed in claim 8 wherein another one of the plurality of platforms is a side platform which extends outwardly from a side of the scratching/climbing panel.

10. A modular animal perch as claimed in claim 8 further including a cap extending around the top portion of an uppermost of said scratching/climbing panels.

11. A modular animal perch as claimed in claim 10 wherein the cap includes a top flat portion whereby an animal may perch on the top flat portion.

12. A modular animal perch as claimed in claim 8 further including a base extending around the bottom portion of a bottom most of said scratching/climbing panels and resting on the floor.

13. A modular animal perch adapted to be attached to a wall and resting on a floor comprising:
    a plurality of scratching/climbing panels each having a top portion, a bottom portion, vertical edge portions, an outer surface and an inner surface and extending upwardly from the floor;

a plurality of platforms extending outwardly and generally horizontally from the climbing/scratching panels, each platform having a platform notch formed therein;

attaching means for attaching said scratching/climbing panels to the wall, the attaching means comprising a plurality of mounting plates which are attached to the wall and an elongate vertical support beam attached to the mounting plates and wherein each scratching/climbing panel is releasably attached to the elongate vertical support beam; and a second attaching means to attach said platforms to the wall, the second attaching means comprising a pair of fasteners for attaching each platform to one of said mounting plate and a plurality of positioning notches formed in the elongate vertical support beam adapted to correspond to the plurality of platform notches whereby in position each platform fits snugly into said positioning notches.

14. A modular animal perch as claimed in claim 13 further including a cap extending around the top portion of an uppermost of said scratching/climbing panels.

15. A modular animal perch as claimed in claim 13 further including a base extending around the bottom portion of a bottom most of said scratching/climbing panel and resting on the floor.

16. A modular animal perch adapted to be attached to a wall and resting on a floor comprising:

a plurality of vertical scratching/climbing panels each having a top portion, a bottom portion, vertical edge portions, an outer surface and an inner surface and extending upwardly from the floor;

a plurality of platforms extending outwardly from the climbing/scratching panels wherein an animal can perch attached to the scratching/climbing panel and wherein one of the plurality of platforms is a full platform which extends outwardly around the whole scratching/climbing panel and having an aperture formed therein whereby an animal can fit therethrough;

an attaching means for attaching the scratching/climbing panel to the wall comprising a mounting assembly attached to the wall and fasteners to releasably attach the scratching/climbing panel to the mounting assembly; and a means for attaching the platforms to the wall whereby each platform is a horizontal surface for animal to perch.

17. A modular animal perch as claimed in claim 16 wherein another of the plurality of platforms is a side platform which extends outwardly from one side of the scratching/climbing panel.

18. A modular animal perch adapted to be attached to a wall and resting on a floor comprising:

a plurality of generally vertical scratching/climbing panels each having a top portion, a bottom portion, vertical edge portions, an outer surface and an inner surface and extending upwardly from the floor;

a plurality of platforms extending outwardly and generally horizontally from the climbing/scratching panels, each platform having a top surface and a bottom surface and at least one platform having an aperture formed therein extending from the bottom surface to the top surface thereof;

an attaching means for attaching each scratching/climbing panel to the wall;

a second attaching means for attaching each platform to the wall; and wherein each platform has a notch formed therein and a corresponding notch is formed in an elongate vertical support beam and a pair of fasteners attaching each platform to separate mounting plates.

* * * * *